United States Patent [19]

Tavallaei et al.

[11] Patent Number: 5,987,538
[45] Date of Patent: Nov. 16, 1999

[54] APPARATUS FOR INITIATING GENERATION OF AN INTER-PROCESSOR INTERRUPT BY A PERIPHERAL DEVICE NOT DIRECTLY CONNECTED TO ANY OF THE MULTI-PROCESSOR LOCAL INTERRUPT CONTROLLERS

[75] Inventors: Siamak Tavallaei; Gary B. Kotzur, both of Spring, Tex.

[73] Assignee: Compaq Computer Corporation, Houston, Tex.

[21] Appl. No.: 08/911,608

[22] Filed: Aug. 15, 1997

[51] Int. Cl.$^6$ .................................................... G06F 13/14
[52] U.S. Cl. .......................... 710/48; 710/260; 710/261; 710/266; 710/268
[58] Field of Search ...................................... 395/733, 741, 395/739, 868; 710/48, 49, 260, 261, 266, 268

[56] References Cited

U.S. PATENT DOCUMENTS

| 5,526,289 | 6/1996 | Dinh et al. | 364/557 |
|---|---|---|---|
| 5,574,667 | 11/1996 | Dinh et al. | 364/557 |
| 5,619,705 | 4/1997 | Karnik et al. | 395/739 |
| 5,619,706 | 4/1997 | Young | 395/741 |
| 5,631,800 | 5/1997 | Jin et al. | 361/103 |
| 5,634,038 | 5/1997 | Saitoh | 395/490 |
| 5,638,895 | 6/1997 | Dodson | 165/121 |
| 5,727,217 | 3/1998 | Young | 395/733 |

OTHER PUBLICATIONS

The I$^2$C–Bus and how to use it (including specification); *Philips Semiconductor*; Apr. 1995; pp. 1/24.
"Remote 8–bit I/O expander for I$^2$C–Bus" Data Sheet; *Philips Semiconductor*; Apr. 2, 1997; pp. 1–23.
Farnsworth, C.; "Low Power Implementation of an I$^2$C–Bus Expander"; http://maveric0.uwaterloo.ca/amulet/publications/thesis farnsworth94–msc.html; Jun. 16, 1997; one page.
Collins, Andy; "Interfacing TMS370 Microcontrollers to I$^2$C–Bus ICs"; Logikos; wysiwyg://III/http://www.logikos.com/tms370.html;Jun. 16, 1997; pp. 1–6.
"I$^2$C–Bus Expander" Application Note AN036; *Philips Semiconductors Programmable Logic Devices*; Oct., 1993; 22 pages.
"The PCI (Peripheral Component Interconnect) Bus"; Aug. 6, 1997; pci.txt at www.gl.umbc.edu; pp. 1–7.
Barton, Jim; "Re: What's the difference between locks and semaphores?"; (jmb@patton .wpd.sgi.com) Jan. 2, 1991; Accessed Jun. 16, 1997; http://www.sgi.com/Archive/comp.sys.sgi/1991/Jan/0006.html.
"Internal Data Structures, 6.4.3 Semaphores" Basic Concepts; Accessed Jul. 11, 1997; http://linux.www.db.erau.edu/LPG/node47.html.
"The PCI Local Bus"; Accessed Jul. 27, 1 997; http://www.rns.com/whats new/wh pci.html.
"PCI Bus Technology" Information Brief; *IBM Personal Computing Solutions*; Accessed Jul. 27, 1997; http://www-w.us.pc.ibm.com/infobrf/ibpci.html.
"PCI164 Screamer Functional Diagram" Microway; Accessed Jul. 27, 1997; http://www.microway.com/block.html.

(List continued on next page.)

*Primary Examiner*—Thomas C. Lee
*Assistant Examiner*—Abdelmoniem I Elamin
*Attorney, Agent, or Firm*—Jenkens & Gilchrist, P.C.

[57] ABSTRACT

Apparatus, and an associated method, for requesting initiation of generation of an interrupt at an I/O APIC (input/output advanced programmable interrupt controller) of a multi-processor computer system. Initiation of generation of the inter-processor interrupt is requested by a peripheral component device, such as a PCI bus controller, not directly connected to an APIC bus extending to interrupt controllers associated with each of the processors of the multi-processor computer system. The interrupt permitted to be initiated by the peripheral component device includes, inter alia, a remote read request.

15 Claims, 4 Drawing Sheets

OTHER PUBLICATIONS

"The PCI (Peripheral Component Interconnect) Local Bus" description of PCI Bus; Accessed Jul. 27, 1997; http://www.sundance.com/pci.html.

"CMOS Bus Switches Provide Zero Delay Bus Communication" Application Note AN–09; *Quality Semiconductor Inc.*; date unknown; pp. 1–9.

"High–Performance CMOS Analog 8–Channel Switch" QS4A05Q Preliminary; *Quality Semiconductor Inc.*; May 30, 1996; pp. 1–7.

"Quickswitch® Converts TTL Logic to Hot Plug Operation" Application Note AN–13; *Quality Semiconductor Inc.*; date unknown; pp. 1–5.

APPARATUS FOR INITIATING GENERATION OF AN INTER-PROCESSOR INTERRUPT BY A PERIPHERAL DEVICE NOT DIRECTLY CONNECTED TO ANY OF THE MULTI-PROCESSOR LOCAL INTERRUPT CONTROLLERS

BACKGROUND OF THE INVENTION

1. Field of the Invention

The present invention relates generally to the generation of inter-processor interrupts in a multi-processor computer system in which each of the processors of the computer system is coupled to a local APIC (advanced programmable interrupt controller). More particularly, the present invention relates to apparatus, and an associated method, for permitting generation of an inter-processor interrupt to be initiated by a peripheral component device, such as a PCI bus controller, not directly connected to any of the local APICs. The interrupt permitted to be initiated by the peripheral component device includes, inter alia, a remote read request.

The peripheral component device is coupled, instead, to an I/O APIC. The I/O APIC, in turn, is coupled via an APIC bus with the local APICs. The peripheral component device requests the I/O APIC to generate a selected inter-processor interrupt upon the APIC bus to effectuate the desired interrupt. Responses to the interrupt are provided to a register of the I/O APIC. The contents of the register are accessible by the peripheral component device.

Operation of an embodiment of the present invention increases the serviceability of a multi-processor computer system. Component devices, such as the PCI bus controller, which otherwise are unable to generate directly inter-processor interrupts, are able to initiate generation of the inter-processor interrupts. A remote read inter-processor interrupt is exemplary of an inter-processor interrupt, the initiation of which is provided through operation of an embodiment of the present invention. Data read from a selected processor responsive to the remote read interrupt is provided to a register of the I/O APIC which can be accessed by the peripheral component device.

2. Description of Related Art

Networks serve the purpose of connecting many different personal computers (PCS), workstations, or terminals to each other, and to one or more host computers, printers, file servers etc., so that expensive computing assets, programs, files and other data may be shared among many users.

In a network utilizing a client/server architecture, the client (personal computer or workstation) is the requesting machine and the server is the supplying machine, both of which may preferably be connected via the network, such as a local area network (LAN), wide area network (WAN) or metropolitan area network (MAN). This is in contrast to early network systems that utilized a mainframe with dedicated terminals.

In a client/server network, the client typically contains a user interface and may perform some or all of the application processing and, as mentioned above, can include personal computers or workstations. The server in a client/server network can be a high-speed microcomputer or minicomputer and in the case of a high-end server can include multiple processors and mass data storage devices such as multiple CD-ROM drives and multiple hard drives, preferably with "redundant array of inexpensive disk" (RAID) protection. An exemplary server such as a database server maintains the databases and processes requests from the client to extract data from or to update the database. An application server provides additional business processing for the clients. The network operating system (NOS) together with the database management system (DBMS) and transaction monitor (TP monitor) are responsible for the integrity and security of the server.

Client/server networks are widely used throughout many different industries and business organizations, especially where mission-critical applications requiring high performance are routinely launched. The mass storage and multi-processing capabilities provided by current client/server network systems (for example, the high-end servers) that run such applications permit a wide range of essential services and functions to be provided through their use.

As can be appreciated, many of these businesses are highly dependent upon the availability of their client/server network systems to permit these essential network services and functions to be carried out. As these client/server network systems become increasingly essential to the everyday operations of these businesses, additional steps need to be taken in the design and construction of the server in the client/server network system to ensure its continuous availability to the clients. That is to say, in the design and construction of a server, steps need to be taken to ensure that the server can be operated with little or no downtime.

It can be appreciated by those skilled in the art that high availability, reliability and serviceability are valuable design aspects in ensuring that a server is a "zero downtime" system that will operate with little or no downtime. The modularity of components within a server has been recognized as an important design consideration in ensuring that the downtime of a server will be minimized. Modules can be removed and examined for operability or other purposes much easier than permanently mounted fixtures within a server chassis. When various components of a server can be provided in a modular form, they can also be readily replaced to maintain the operational status of the server with minimal downtime.

Removable modular components may include disc drives and power supplies. As described above, the removability of modular components allows for better overall serviceability of the computer system which is a distinct advantage. For example, a defective power supply in the server generally requires prompt replacement in order to limit downtime. Modular components and connectors facilitate prompt replacement and are thus popular in many computer designs.

Originally, a rule of practice in the maintenance of modular components or printed circuit boards of a server was that of turning the power to the server off before any modular components or printed circuit boards were removed from or added to the chassis or support frame of the server. Recent innovations have centered around a highly desirable design goal of "hot-pluggability" which addresses the benefits derived from inserting and removing modular components and printed cards from the chassis of the server when the server is electrically connected and operational. It can be readily appreciated that modularization and hot-pluggability can have a significant bearing on the high availability aspect of a high-end server.

Hot-pluggable components may include storage or disc drives, drive cages, fans, power supplies, system I/O boards, control boards, processor boards, and other sub-assemblies. The ability to remove these constituent components without having to power down the server allows for better overall serviceability of the system, which is a distinct advantage to both the user and the maintenance technician.

Component redundancy has also been recognized as an important design consideration in ensuring that a server will operate with little or no downtime. Essentially, component redundancy is typically provided in a system to better ensure that at least one of the redundant components is operable, thereby minimizing the system downtime. With component redundancy, at least two components are provided that can perform the same function, such that if one of the components becomes faulty for some reason, the operation fails over to the redundant component. When at least one of the redundant components is operable, continued operation of the computer system is possible even if others of the redundant components fail. To further enhance reliability and serviceability, redundant components have been made hot-pluggable.

Dynamic reconfiguration of a server system can also be accomplished by providing upgradable modular components therein. As can be readily appreciated, this objective can be accomplished by the addition or substitution of components having different circuits, preferably updated or upgraded, disposed therewithin. When components are redundant and hot-pluggable, reconfiguration of the server is often possible without taking the server offline.

Another important design aspect with respect to providing redundant and hot-pluggable components in a server system is to ensure and maintain a safe working environment while the server is operating and being repaired or upgraded. Accordingly, when the system components are swapped or upgraded, the exposure of hot connectors and contacts must be kept to a minimum. It can be appreciated by those skilled in the art that further developments in this area would significantly enhance the reliability and serviceability aspects of a high-end server system.

To further enhance the serviceability of server systems, additional innovations may be required in the design and construction of diagnostic sub-systems thereof. In existing client/server network systems it is often difficult to obtain in a timely manner important diagnostic data and information corresponding to a component failure in order to facilitate the quick serviceability of the server. Therefore, it can be appreciated that the more information that can be readily provided to locate a defective component or problem with the server, the better is the optimization of the amount of time the server is up and running.

Computer servers, as well as other types of computer systems, are sometimes formed of multiple numbers of processors connected in a manner to permit their operation in parallel. A computer system including such an arrangement is sometimes referred to as a multi-processor computer system. Use of a multi-processor computer system is advantageous as computations to be performed to execute one or more tasks can be performed in parallel. The speed at which a task can be completed can, therefore, generally be increased significantly in contrast to the speed at which the corresponding task can be completed by a single-processor system.

Many conventional computer systems permit the generation of interrupt messages to alert the processor of special conditions, typically those conditions which require priority attention. Generally, an interrupt is an event which indicates that a certain condition somewhere in the computer system requires the attention of the computer system processor to deal with the condition. The action taken by the processor responsive to the interrupt is referred to as "serving" the interrupt.

Provision for the servicing of interrupts becomes more complex in a multi-processor computer system as the interrupt must be directed towards an appropriate one of the processors.

APICs (advanced programmable interrupt controllers) are sometimes used to control the interrupt process. The APICs are coupled together by way of an APIC bus upon which inter-processor interrupts (IPIs) are generated. The Intel Pentium™ Pro Family Series includes exemplary APICs. APICs associated with the processors, according to at least one APIC manufacturer, are referred to as local APICs while APICs associated with other, such as input and output, devices are referred to as I/O APICs. The interrupts permitted to be generated by local APICs might include interrupts which are privileged to the local APICs. That is to say, some interrupts are conventionally generated only by local APICs and are not typically generated by I/O APICs.

Devices not coupled to the APIC bus conventionally are unable to generate interrupts or obtain information related to responses to such interrupts. A PCI (peripheral controller interface/interconnect) is exemplary of a device which typically is not directly associated with an APIC and is conventionally unable to cause the generation of interrupts or receive information related to responses thereto.

Even if such a device is able indirectly to cause the generation of inter-processor interrupts, interrupt messages conventionally reserved for local APICs cannot be indirectly initiated by such a device by way of an I/O APIC. A remote read interrupt is exemplary of an interrupt which is conventionally reserved for use by a local APIC, and, therefore, conventionally cannot be initiated, even indirectly, by a device even by way of an I/O APIC.

As information obtained from a remote read interrupt operation would be of advantage in ensuring a high level of serviceability of the computer system, a manner by which a remote read interrupt operation could be initiated would be advantageous.

It is in light of this background information related to the generation of interrupt messages in a multi-processor computer system that the significant improvements of the present invention have evolved.

SUMMARY OF THE INVENTION

The present invention, accordingly, advantageously provides apparatus, and an associated method, which permits initiation of generation of inter-processor interrupts in a multi-processor computer system by a device not directly coupled to an interrupt controller bus.

The multi-processor computer system includes a local APIC (advanced programmable interrupt controller) associated with each of the processors of the computer system. The local APICs are connected together by way of an APIC bus. Inter-processor interrupts, and responses thereto, are communicated by way of the APIC bus. An I/O APIC (input/output advanced programmable interrupt controller) is associated with another component device of the computer system, such as an ASIC (application specific integrated circuit). The I/O APIC is also coupled to the APIC bus. A selected number of interrupt messages can also be generated by the I/O APIC for communication on the APIC bus to any of the local APICs and the processors associated therewith. The component device is, in turn, also coupled by way of another bus, such as a PCI (peripheral component interface/interconnect) bus with a peripheral device, such as a PCI bus controller. In such an arrangement, the PCI bus controller requests initiation of generation of an interrupt message by the I/O APIC by providing the request thereto by way of the PCI bus. Interrupt messages capable of being generated by the I/O APIC include, inter alia, a remote read interrupt, a stop clock on interrupt, a stop clock off interrupt, and a system management interrupt. Responses to the interrupt message are provided to a register of the I/O APIC, and, therefrom, also to be accessible by the PCI bus controller, or other device.

Interrupt messages, previously unavailable to an I/O APIC, are thereby able to be requested to be generated by a device not directly coupled to the APIC bus through operation of an embodiment of the present invention. Information provided responsive to the interrupt messages can be used by the peripheral component, or other device, for example, to increase the serviceability of the computer system.

In these and other aspects, therefore, apparatus, and an associated method, for a computer system are disclosed. The computer system has a first set of component elements. Each component element of the first set includes a first-type interrupt controller associated therewith. The computer system also includes a second component element which includes a second-type interrupt controller associated therewith. Each of the first-type interrupt controllers and the second-type interrupt controller are connected together by a first bus upon which inter-element interrupt messages are communicated. The computer system also includes a peripheral component element coupled to the second component element by a second bus. The apparatus, and associated method, permit initiation of communication of inter-element interrupt messages on the first bus upon request by the peripheral component element. A peripheral-component-element interrupt register receives a request generated by the peripheral component element on the second bus to initiate communication of a selected inter-element interrupt message upon the first bus. An inter-element interrupt message generator is operable responsive to the request received at the peripheral-component-element register to generate the selected inter-element interrupt message. A return register receives a response to the selected inter-element interrupt message.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE DRAWINGS

Figure 1:
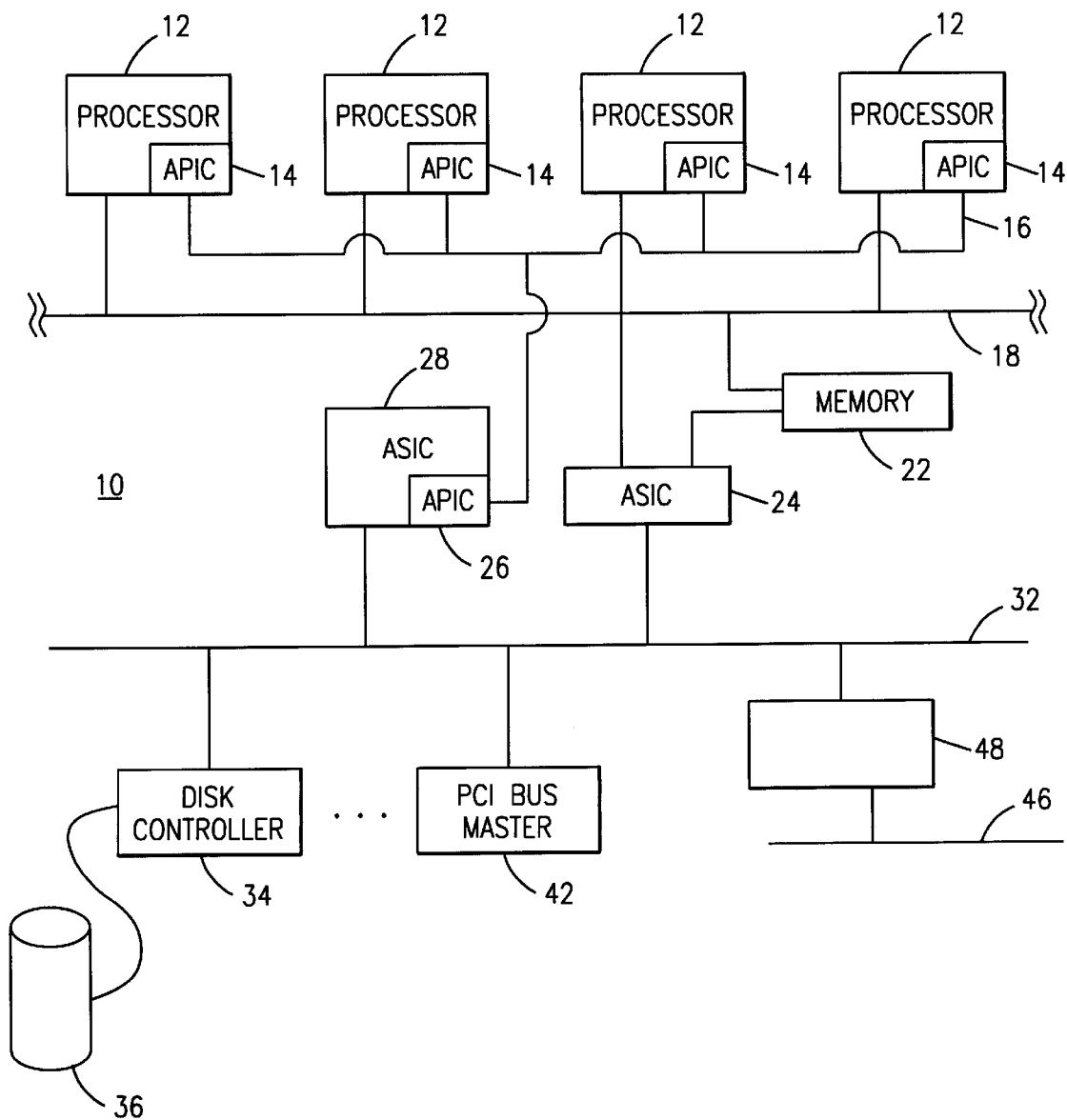
FIG. 1 illustrates a functional block diagram of a portion of a computer system, such as a computer server, in which an embodiment of the present invention is operable.

Referring first to FIG. 1, a computer system, shown generally at 10, includes a multiple number of processors 12 coupled in parallel to permit processing functions to be performed by individual ones of such processors concurrently. A multi-processor computer system, of which the computer system 10 is exemplary, advantageously permits computer tasks to be performed in parallel, thereby increasing the speed at which computer tasks can be completed. The computer system 10 is representative, e.g., of a computer server.

A local APIC (advanced programmable interrupt controller) 14 is associated with each of the processors 12. In the exemplary embodiment, the local APICs are located on the same chip as that upon which the processor 12 associated with the respective APIC is also located.

Each of the local APICs is coupled together by way of an APIC bus 16. In the exemplary embodiment, the APIC bus 16 is formed of a three-wire bus including two data lines and a clock line upon which a clock signal is generated.

The computer system 10 is further shown to include a processor bus 18 which is also coupled to the processors 12. The processor bus 18 is utilized during normal operation of the computer system 10 to communicate data generated during normal operation of the computer system. Data is communicated, e.g., between the processors 12 and also other devices, such as a memory element 22 and a special-purpose ASIC (application specific integrated circuit) 24.

The APIC bus 16 is dedicated for the communication of interrupt messages and responses thereto. Inter-processor interrupt (IPI) messages are generated by individual ones of the local APICs and are communicated to selected others of the local APICs when the attention of one or more of the processors is required to address a particular system condition. The APIC bus 16 further extends to an I/O APIC (input/output advanced programmable interrupt controller) associated with another circuit device, here an ASIC 28.

The local APICs 14 are operable to perform two primary functions for the processor. First, the local APICs 14 process local external interrupts that the processor 12 associated therewith receives at its interrupt pins (not shown in the FIG.) and local internal interrupts generated during execution of system software. The local APICs 14 communicate, by way of the APIC bus 16, with the external I/O APIC 26. The I/O APIC 26 receives external interrupt events from the system and inter-processor interrupts from the processors 12. The APIC 26 also distributes inter-processor interrupts to the processors on the system bus.

The computer system 10 is further shown to include a PCI (peripheral component interconnect/interface) bus 32. Peripheral component devices, such as the disk controller 34 are coupled to the PCI bus 32. The disk controller 34 controls operation of one or more disk drives 36. While not separately shown, other peripheral component devices are similarly coupled to the PCI bus 32. A PCI bus master or initiator 42 is further coupled to the PCI bus 32. The bus master 42 is operable to initiate and control communications upon the PCI bus 32. The ASIC 28 is further coupled to the PCI bus 32.

The computer system includes further elements and buses of which the EISA (extended industry standard architecture) bus 46 is exemplary. The EISA bus 46 is here shown to be coupled to a peripheral component 48 which, in turn, is also coupled to the PCI bus 32.

During operation of an embodiment of the present invention, the PCI bus master 42 is able to request generation of an interrupt message upon the APIC bus 16 even though the bus master 42 is not directly coupled thereto. The request is generated upon the PCI bus 32 and provided to the ASIC 28 and, in turn, to the I/O APIC 26. The interrupt messages which can be requested to be generated include interrupt messages previously privileged to the local APICs 14 and unavailable to the I/O APIC 26. For instance, a remote read interrupt message can be requested by the PCI bus master 42. When the request is received by the I/O APIC 26, the appropriate interrupt message is caused to be generated upon the APIC bus 16 to the appropriate local APIC 14 and the processor 12 associated therewith. Responses to the interrupt message are returned to the I/O APIC 26 and stored in a register thereof. The information stored in the register is accessible by the PCI bus master 42 by way of the PCI bus 32.

Figure 2:
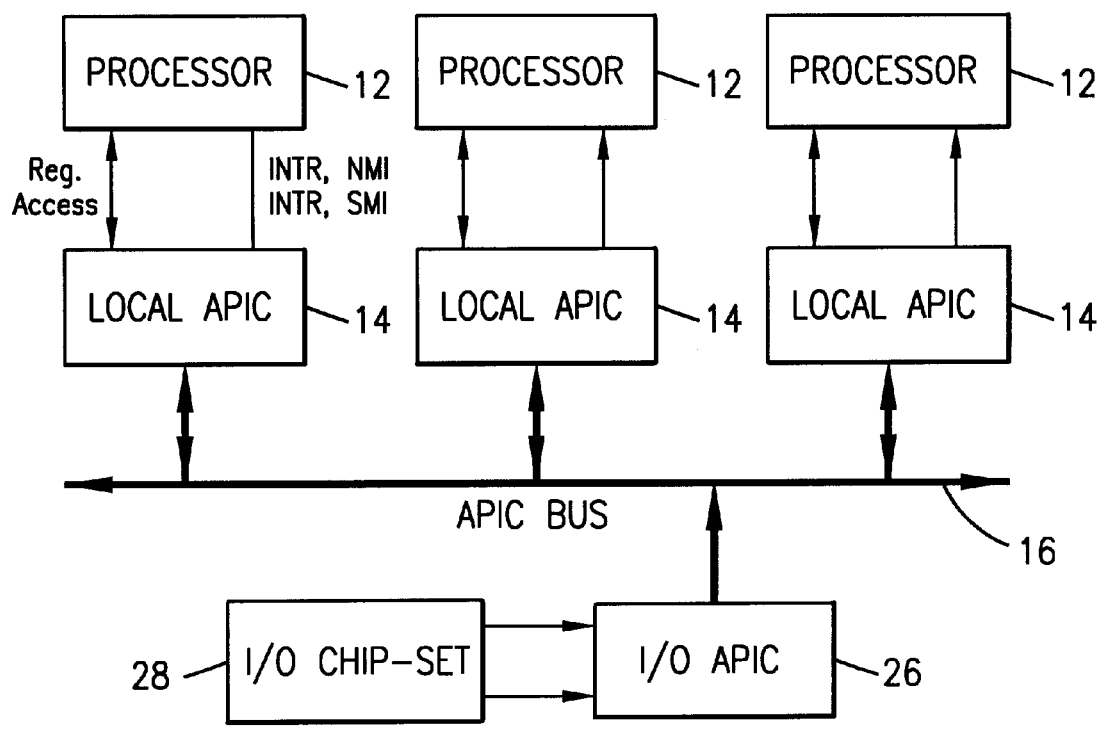
FIG. 2 illustrates a functional block diagram of the arrangement of APICs (advanced programmable interrupt controllers) forming a portion of the computer system shown in FIG. 1.

FIG. 2 again illustrates the APICs 14 and 26 coupled together by way of the APIC bus 18 which together form a portion of the computer system 10 shown in FIG. 1. Each of the local APICs 14 is operable to determine whether the processor 12 associated therewith should accept an interrupt message broadcast upon the APIC bus 18. The local APICs 14 also provide for the local pending of interrupts as well as providing for the nesting and masking of interrupts. Each of the local APICs 14 further handles all interactions with the processor associated therewith including, for example, the INTR/INTA/EOI protocol discussed in Intel's Pentium® Pro Family Developer's Manual, which is incorporated herein by this reference thereto. And, each of the local APICs 14 further provides inter-processor interrupts accepted thereat to its associated processor 12 together with a timing signal generated upon the clock line of the APIC bus 18.

The I/O APIC 26 is operable, inter alia, to provide the interrupt input pins (not shown in the FIG.) upon which I/O devices, here represented by the ASIC 28, inject interrupts upon the bus 18. The interrupts may be edge- or level-generated. As shall be noted below, the I/O APIC 26 includes a redirection table with an entry for each interrupt input pin. Each entry in the redirection table is individually programmed to indicate whether an interrupt on the pin is recognized as either an edge- or a level-based input. The redirection table also indicates to what vector and also to what priority the particular interrupt has associated therewith and to which of the processors 12 the interrupt message is directed. Also, the redirection table indicates to which of the processors 12 the interrupt is to be directed.

Figure 3:
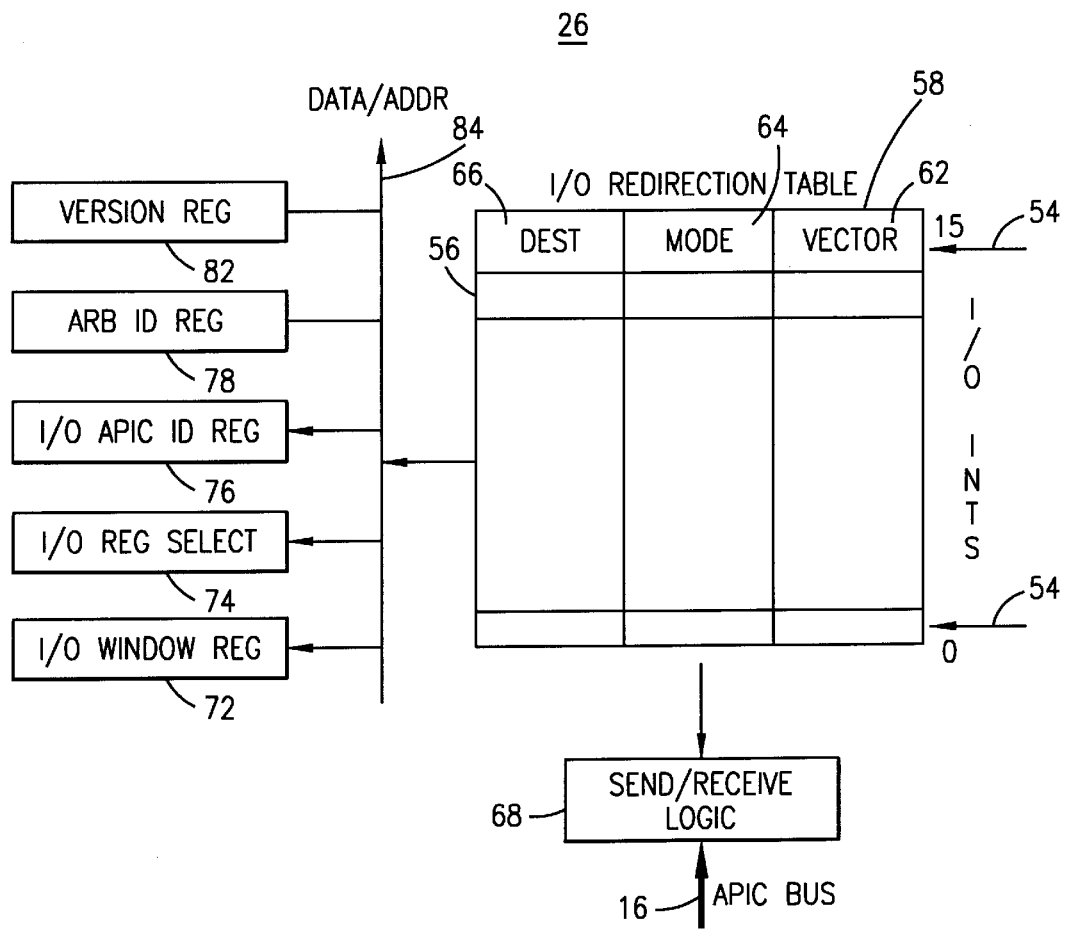
FIG. 3 illustrates a functional block diagram of an I/O APIC (input/output advanced programmable interrupt controller) of which an embodiment of the present invention forms a portion.

FIG. 3 illustrates a portion of the I/O APIC 26 in greater detail. Here, sixteen I/O interrupt input pins 54 are shown. Requests for the generation of interrupts are generated on selected ones of the input pins 54. In the exemplary embodiment, a signal generated on each of the different input pins 54 is representative of a different, requested interrupt.

Responsive to the pin upon which a signal is generated, access is made to a selected entry 56 upon an I/O redirection table 58. The redirection table includes information, here indicated to include a vector field 62, a mode field 64, and a destination field 66. Information contained in the appropriate entry 56 provides information necessary to format an interrupt message responsive to the signal generated on the associated input pin 54. Thereafter, the interrupt message is communicated upon a data line of the APIC bus 18 which is here shown to be coupled to the I/O APIC through send/receive logic 68 thereof.

The APIC 26 is further shown to include a plurality of registers including, inter alia, I/O window register 72, and I/O register select 74, an I/O APIC ID register 76, an arbitrator ID register 78, and a version register 82. Each of the registers is addressable by way of a data/address bus 84.

Figure 4:
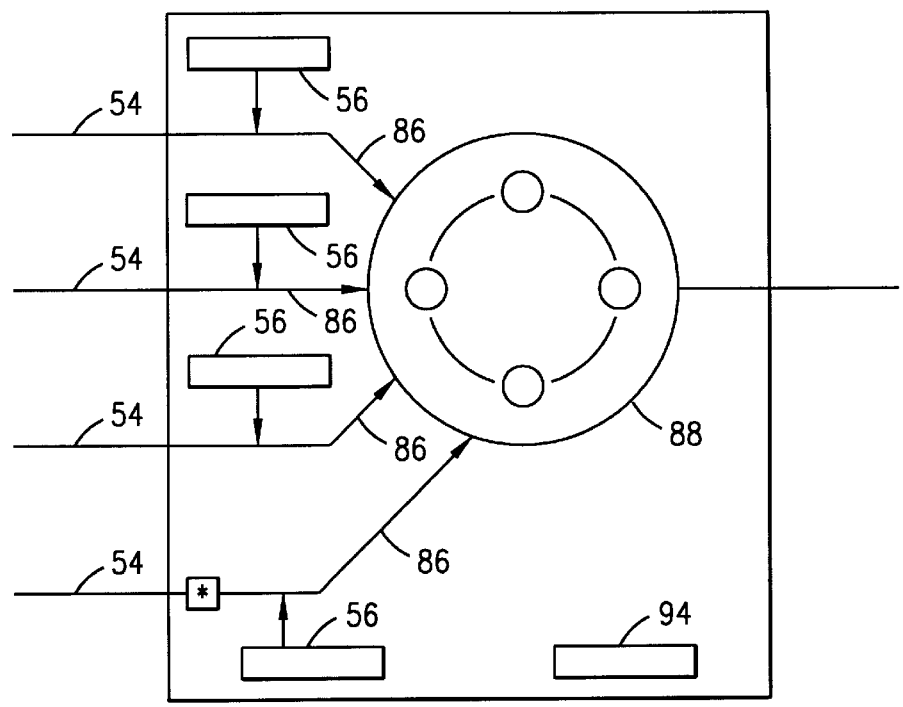
FIG. 4 illustrates another functional block diagram of the I/O APIC of which an embodiment of the present invention forms a portion.

FIG. 4 illustrates again the I/O APIC in which an embodiment of the present invention is operable. Again, the ASIC 26 includes a plurality of input pins 54 upon which signals are generated to request initiation of generation of an interrupt message. Each pin 54 is associated with a particular entry 56 of the I/O redirection table 58 (shown in FIG. 3).

Each of the entries 56 is associated with a line 86 extending to a state table 88. When a signal is generated on a respective one of the lines 54 to request generation of a particular interrupt message, the state table 88 and an appropriate state therein generates an interrupt message on the APIC bus 18 of values determined by the information contained in the relevant entry 56. While a line 86 is illustrated in the FIG. to extend to the state table 88, the interrupt may be software-generated. That is to say, the signal generated on a line 54, in one embodiment, sets a flag in a register 92 to precipitate the state table 88 to enter a particular state to generate a particular interrupt message upon the APIC bus 18. The APIC 26 is further shown to include a register 94 at which a response to the interrupt message is provided.

Figure 5:
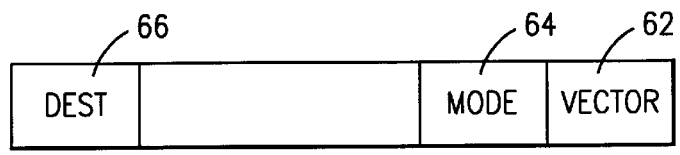
FIG. 5 illustrates the format of a single, re-direction table entry which forms a portion of an embodiment of the present invention.

FIG. 5 illustrates an exemplary entry 56 of the I/O redirection table 58 shown in FIG. 3 to form a portion of the I/O APIC 26. Each entry 56 is programmable to permit the interrupt message associated with a particular input pin 54 to be programmable. The contents of the entry is used to translate an interrupt manifestation on a particular input pin 54 into an inter-APIC interrupt message to be generated upon the APIC bus 18.

In the exemplary embodiment, the entry 56 is of a sixty-four bit length in which the vector field 62 is formed of bits 0–7, the delivery mode field is comprised of bits 8–10, and the destination field is formed of bits 56–63. Other bits of the entry 56 are used for other purposes or are otherwise reserved.

The vector field 62 indicates the type of interrupt message to be generated. In one embodiment, the vector field is of values corresponding to that of a remote read interrupt message. In other embodiments, the vector field are of values corresponding to a set clock on or a set clock off vector field.

The delivery mode field 64 specifies how the APIC identity listed in the destination field 66 should act upon reception of the interrupt message. The destination field 66 contains the identity of the destination APIC 54.

By insertion of appropriate information into the entries 56 of the I/O redirection table 58, signals generated on any of the input pins 54 cause generation of any desired interrupt message upon the APIC bus 18. A peripheral component device, such as a PCI bus master can request initiation of generation of an interrupt message by sending a signal to an appropriate input pin 54 applied to the APIC 26.

The entry 56 associated with the input pin 54 is determinative of the interrupt message generated by the APIC 26 upon the APIC bus 18. Responses to the interrupt message are provided to the register 94 of the APIC 26, and the peripheral component device is able to access the register 94 to obtain the information stored therein.

Figure 6:
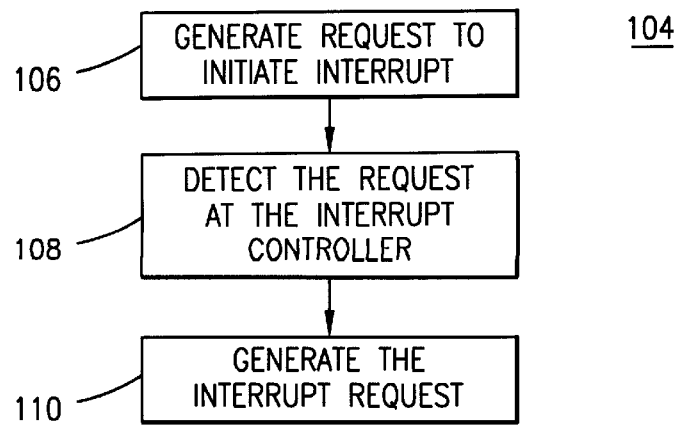
FIG. 6 illustrates a method flow diagram of the method of operation of an embodiment of the present invention.

FIG. 6 illustrates a method, shown generally at 104, of an embodiment of the present invention. The method 104 generates an interrupt message in a computer system having a first set of component elements. Each component element of the first set includes a first-type interrupt controller associated therewith. A second component element of the computer system includes a second-type interrupt controller associated therewith. Each of the first-type interrupt controller and the second-type interrupt controller are connected together by a first bus upon which inter-element interrupt messages are communicated. A peripheral component element is coupled to the second component element by a second bus.

First, and as indicated by the block 106, a request is generated at the peripheral-component-element upon the second bus to initiate communication of a selected inter-element interrupt message upon the first bus. Then, and as indicated by the block 108, the request is detected at a peripheral-component-element register of the second-type interrupt controller.

Responsive thereto, and as indicated by the block 110, an inter-element interrupt message generator generates the selected inter-element interrupt message upon the first bus to a selected component element of the first set of component elements.

Operation of an embodiment of the present invention permits generation of an inter-processor interrupt to be initiated by a peripheral component device, such as a PCI bus controller, which is not directly connected to any of the local APICs. Serviceability of the computer system is thereby enhanced as the peripheral component device is permitted access to additional levels of information related to operation of the processors of a multi-processor computer system.

The previous descriptions are of preferred examples for implementing the invention, and the scope of the invention should not necessarily be limited by this description. The scope of the present invention is defined by the following claims.

What is claimed is:

1. An I/O APIC (input/output advanced programmable interrupt controller) equipped apparatus operable in a multi-processor computer system, the multi-processor computer system having a local APIC (advanced programmable interrupt controller) associated with each processor of the multi-processor computer system, an APIC bus for connecting each APIC theretogether, and a peripheral component device coupled thereto by way of a peripheral component bus, said I/O APIC equipped apparatus comprising:

a peripheral component device interrupt register for receiving a request generated by the peripheral component device upon the peripheral component bus to initiate communication of a selected interrupt message upon the APIC bus;

an interrupt message generator operable responsive to the request received at said peripheral component device interrupt register to generate the selected inter-element interrupt message; and a return register for receiving a response to the selected interrupt message.

2. In a computer system having a first set of component elements, each component element of the first set including a first-type interrupt controller associated therewith, a second component element, the second component element including a second-type interrupt controller associated therewith, each of the first-type interrupt controller and the second-type interrupt controller connected together by a first bus upon which inter-element interrupt messages are communicated, and a peripheral component element coupled to the second component element by a second bus, an improvement of apparatus for the second-type interrupt controller permitting initiation of communication of inter-element interrupt messages upon the first bus upon request by the peripheral component element, said apparatus comprising:

a peripheral-component-element interrupt register for receiving a request generated by the peripheral-component-element upon the second bus to initiate communication of a selected inter-element interrupt message upon the first bus;

an inter-element interrupt message generator operable responsive to the request received at said peripheral-component-element register to generate the selected inter-element interrupt message; and a return register for receiving a response to the selected inter-element interrupt message;

wherein the second-type interrupt controller comprises an I/O APIC.

3. The apparatus of claim 2 wherein the peripheral-component-element comprises a PCI (peripheral component interface/interconnect) bus master, the second bus comprises a PCI bus, and wherein said peripheral-component-element interrupt register is coupled to receive indications of the request to initiate the communication of the selected inter-element interrupt message.

4. The apparatus of claim 3 wherein the computer system comprises a multi-processor computer system, wherein the component elements of the first set comprise processor elements, wherein the first-type interrupt controllers comprise local APICs (advanced programmable interrupt controllers), wherein the first bus comprises an APIC bus, and wherein the selected inter-element interrupt message, the indication of the request of which is received by said peripheral-component-element interrupt register comprises a remote read interrupt.

5. The apparatus of claim 3 wherein the computer system comprises a multi-processor computer system, wherein the component elements of the first set comprise processor elements, wherein the first-type interrupt controllers comprise local APICs (advanced programmable interrupt controllers), wherein the first bus comprises an APIC bus, and wherein the selected inter-element interrupt message, the indication of the request of which is received by said peripheral-component-element interrupt register comprises a stop clock on interrupt.

6. The apparatus of claim 3 wherein the computer system comprises a multi-processor computer system, wherein the component elements of the first set comprise processor elements, wherein the first-type interrupt controllers comprise local APICs (advanced programmable interrupt controllers), wherein the first bus comprises an APIC bus, and wherein the selected inter-element interrupt message, the indication of the request of which is received by said peripheral-component-element interrupt register comprises a stop clock off interrupt.

7. The apparatus of claim 3 wherein said inter-element interrupt signal generator comprises a state table having a plurality of states, the state of the plurality states in which said state table resides dependent upon the inter-element interrupt message requested by the PCI bus master.

8. The apparatus of claim 7 wherein the state of the plurality of states in which said state table resides has associated therewith a vector field and a destination mode field, the vector field identifying the selected interrupt message requested by the PCI bus master to be communicated and the destination field identifying to which component element of the first set of component elements the interrupt message is to be directed.

9. The apparatus of claim 8 wherein the state of the plurality of states in which said state table resides further comprises a delivery mode field associated therewith, the delivery mode field identifying a manner by which the component element identified in the destination field is to respond to the interrupt message.

10. The apparatus of claim 7 wherein said return register is coupled to the second bus to permit the second component element to access the response received at said return register.

11. The apparatus of claim 2 wherein the second component element comprises an ASIC (application specific integrated circuit), the second-type interrupt controller comprises an I/O APIC (input/output advanced programmable interrupt controller), and wherein said peripheral-component-element interrupt register, said inter-element interrupt message generator and said return register are embodied together with the ASIC.

12. A method for generating an interrupt message in a computer system having a first set of component elements, each component element of the first set including a first-type interrupt controller associated therewith, a second component element, the second component element including a second-type interrupt controller associated therewith, each of the first-type interrupt controller and the second-type interrupt controller connected together by a first bus upon which inter-element interrupt messages are communicated, and a peripheral component element coupled to the second component element by a second bus, said method comprising the steps of:

generating a request at the peripheral-component-element upon the second bus to initiate communication of a selected inter-element interrupt message upon the first bus;

detecting the request generated during said step of requesting at a peripheral-component-element register of the second-type interrupt controller;

generating, at an inter-element interrupt message generator of the second-type interrupt controller, the selected inter-element interrupt message upon the first bus to a selected component element of the first set of component elements; and receiving in the second-type interrupt controller a response message to the inter-element interrupt message;

wherein the second-type interrupt controller is an APIC.

13. The method of claim 12 comprising the further step of detecting, at the selected component element of the first set of component elements, the selected inter-element interrupt message generated upon the first bus by the inter-element interrupt message generator.

14. The method of claim 13 comprising the further step of responding, at the selected component element of the first set of component elements, with the response message to the selected inter-element interrupt message.

15. The method of claim 14 comprising the further step of accessing the response message provided to the second-type interrupt controller by the peripheral component element by way of the second bus.

* * * * *